Sept. 1, 1959 E. A. BROWN 2,902,676

NON-DESTRUCTIVE SENSING OF MAGNETIC CORES

Filed Oct. 1, 1953

INVENTOR.
EDGAR ALAN BROWN

BY William V. Schelberg
AGENT 2,902,676
Patented Sept. 1, 1959

2,902,676

NON-DESTRUCTIVE SENSING OF MAGNETIC CORES

Edgar Alan Brown, Vestal, N.Y., assignor to International Business Machines Corporation, New York, N.Y., a corporation of New York Application October 1, 1953, Serial No. 383,568

14 Claims. (Cl. 340—174)

This invention relates to memory systems in which binary information is stored in magnetic cores and is directed in particular to an arrangement for interrogating such magnetic cores without loss of the stored information.

Magnetic core materials having a low coercive force and high ratio of residual magnetism to saturation magnetism are employed in memory systems as they may be readily magnetized to one remanence state for representing a binary one, and to the opposite remanence state for representing a binary zero. Windings placed about memory elements of such magnetic materials are pulsed to cause a change in remanence states to thereby store binary information as well as to determine subsequently which one of the binary representations had been stored. This type of interrogation alters the remanence state of the memory element and requires additional circuitry for restoring the information unless the storage unit is to be cleared of information after each read-out operation. An example of such a method of operation is found in the co-pending United States patent application, No. 329,410, filed January 2, 1953, on behalf of Gordon E. Whitney.

In accordance with my invention, sensing of the remanence state at which a storage core exists is accomplished in a non-destructive manner by the production of an auxiliary flux field in a path within the principal magnetic circuit of the storage element. This auxiliary flux field reacts with the remanent magnetic flux in such a manner that a voltage is induced in an output winding positioned about the core, which voltage is indicative of the remanence state at which the core stands.

One broad object of the invention, therefore, is to provide a system and method for the non-destructive sensing of magnetic memory elements.

Another object is to provide a simple structural arrangement for producing an auxiliary flux field in a magnetic core which is used for storage of binary information.

Still another object is to provide a structural arrangement for switching a flux field in interrogating and controlling a magnetic memory element without causing erasure of stored information.

A further object of the invention is to provide an improved phase shift device for various control purposes.

Other objects of the invention will be pointed out in the following description and claims and illustrated in the accompanying drawings, which disclose, by way of example, the principle of the invention and the best mode, which has been contemplated of applying that principle.

Magnetic cores fabricated of materials having low coercive force and a high ratio of residual magnetism, may be placed either in one of two stable states of remanence by means of windings on the core to which pulses are applied. Core material for this purpose may have a somewhat rectangular hysteresis loop such as that illustrated in Fig. 1, however, my invention is not restricted to cores in which the residual flux density is a large fraction of the saturation flux density as shown. Point "*a*" on the curve illustrated in this figure, is arbitrarily selected as representing a binary zero and point "*b*" then necessarily represents a binary one. With a core initially magnitized in the zero representing remanence state "*a*," storage of a binary one is accomplished by pulsing an input winding or windings to produce a magnetomotive force of pulse H and cause the core to traverse its hysteresis loop from point "*a*," to point "*c*," which is the point of magnetic saturation in one direction, and when the pulse terminates, the core transfers to point "*b*." Point "*a*" and "*b*" are stable states as mentioned heretofore, and a core magnetized to either one of these remanence conditions will retain that state without external maintenance energy. With a core in state "*a*" initially, storage of a binary zero is accomplished either by failure to apply a magnetomotive force or by application of a force of —H. In the latter case, the hysteresis loop is traversed from point "*a*" to point "*d*" and, on termination of the zero read-in pulse, returns to point "*a*."

In interrogating a magnetic element to determine which of the two states "*a*" or "*b*" are stored, a read-out pulse of —H has heretofore been applied to a winding on the core and the voltage induced in a secondary winding is observed. When in a binary one representing state "*b*," application of such a magnetomotive force causes the core to traverse its hysteresis loop from point "*b*" to point "*d*," and on its removal, to point "*a*." This change in flux produces a significant output pulse in a secondary winding. With the core in a zero representing state "*a*," application of a read-out pulse causes a traversal from point "*a*" to point "*d*" and return, with a negligible flux change taking place and consequently no significant induced pulse produced in the secondary winding. With the core either in a binary zero or binary one representing state, the read-out operation has reset the core to point "*a*" and the information previously retained is destroyed.

Figures 1, 2, 3, 4:
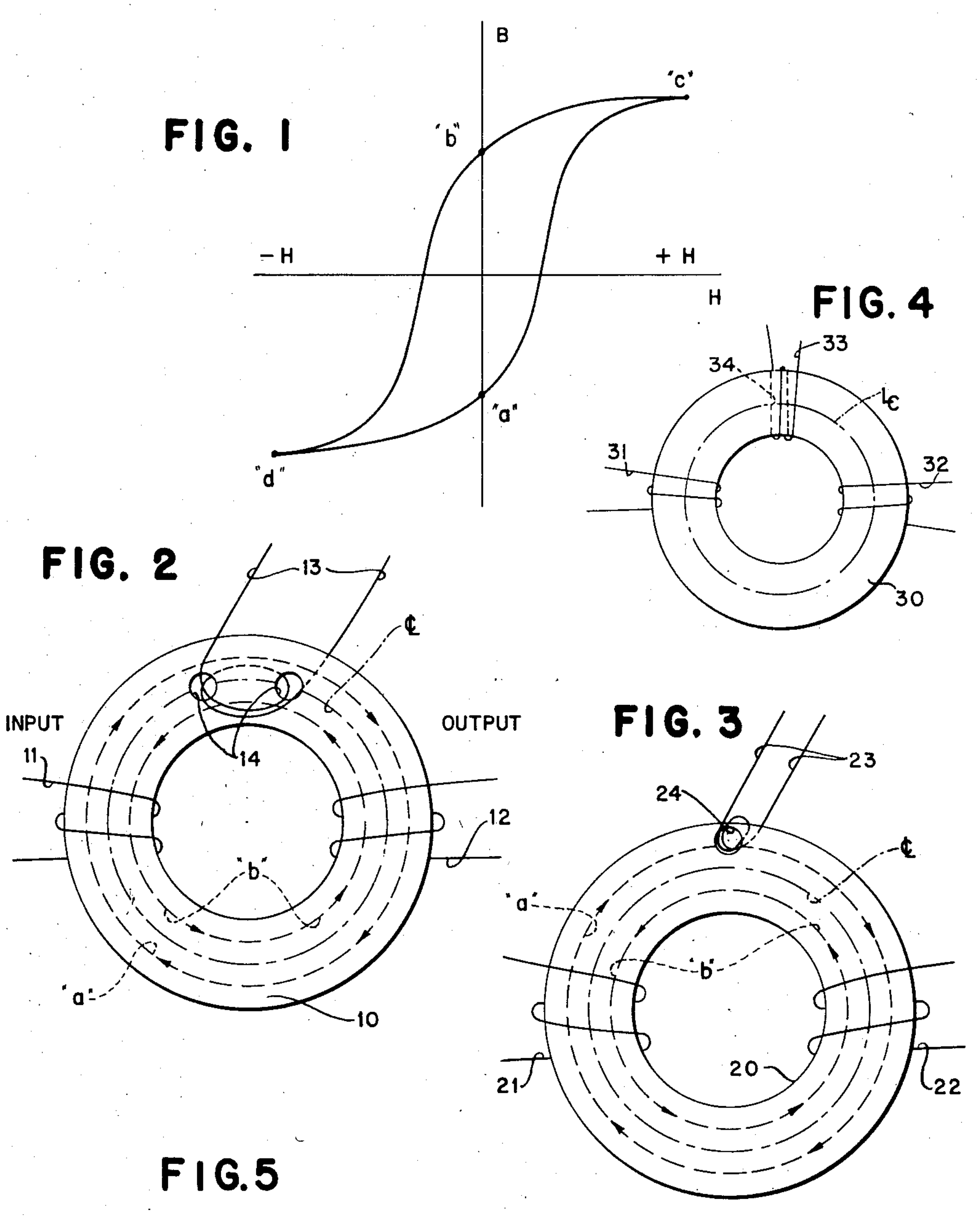
Fig. 1 is a diagram of the hysteresis loop of a core material suitable for use as a magnetic binary element.
Fig. 2 is a schematic illustration of one form of the invention wherein the flux state of a magnetic storage element is so influenced that its remanence condition may be determined in a non-destructive manner.
Fig. 3 illustrates another embodiment of the invention.
Figure 4 illustrates a further embodiment of the invention.

Referring now to Fig. 2, a bistable magnetic core 10 having three windings is illustrated. Windings 11 and 12 are input and output windings respectively and are wound about the core 10 in a conventional manner. Winding 13 is threaded through a pair of spaced holes 14 which may be drilled or otherwise formed through the core preferably though not necessarily at its center line. As illustrated, the openings 14 pass through the toroid in a lateral direction, however, they may be positioned radially or at other angles. Storage of binary information is accomplished in the manner heretofore described by pulsing the input winding 11 in a positive or negative sense so as to cause the core to exist in either remanence state "*a*" or state "*b*." The direction or sense of the residual magnetic flux for each of these conditions of storage is indicated by arrows applied to appropriately labeled dotted lines in the figure.

To obtain an indication of the residual history of the core, winding 13 is pulsed with positive current energy, negative current energy, or current energy of random polarity, or is driven with alternating current, from a source not shown, and an output voltage is induced in winding 12 indicative of the particular remanence state, but without producing any significant alternation of the existing remanence state after the sensing operation. This method of operation allows the core to be sensed any number of times without losing its stored information, and the output is independent of the polarity of the sensing pulse.

The magnitude of the voltage induced in winding 12 is dependent upon the rate of change of flux and consequently upon the rise or decay time of the sensing current. The polarity or residual history of the core may be distinguished by the relative phase relationships of the induced voltages in winding 12 or, if suitable loading is applied or if a suitable waveform of the sensing pulse is chosen, then by the polarity of the output voltage. Energization of winding 13 by a controlled pulse shape such as a sawtooth waveform will cause the rate of flux change in the core to be greater in either an increasing or decreasing direction, dependent upon the waveform of the sensing current, and the magnitude of the voltage induced in one or the other directions may be made negligible in comparison, but the sense of the output is dependent only upon the residual flux direction and not upon the polarity of the applied sensing pulse.

A continuously applied alternating sensing current may then produce an output in the read winding 12 which is of opposite phase depending upon the direction of the residual flux in the core and the arrangement may be employed as a phase shifting device controlled by selectively reversing the direction of residual magnetism. It is further noted that with the core in a state of zero residual flux, no output voltage is produced when the sensing winding is pulsed.

It is obvious that the magnetic structure need not be limited to the toroidal shape used for illustration, and rectangular or other configurations of magnetic cores as well as the openings 14 are contemplated while employing the principal feature of the invention. The advantages of such an arrangement for switching and/or otherwise influencing the flux path within a magnetic element reside in the simplicity with which such a structure may be fabricated as well as the novel manner of producing an output voltage to allow sensing of a memory core without altering its magnetic state.

A further advantage of the arrangement resides in the fact that no signal is produced in the sensing winding 13 during application of input pulses to winding 11 provided the holes 14 lie in a circumferential line. This feature eliminates any need to de-energize or block the sensing circuit during intervals when information is stored in the magnetic core and simplifies the auxiliary circuitry conventionally employed with magnetic memory elements.

Still another advantageous feature resides in the production of signals in the output winding 12 which are identical to the output signals produced on reading during intervals when the input winding is pulsed in writing a binary one or zero. This feature has utility in checking the correctness of the stored information at the time of input and provides added reliability to memory systems employing the novel sensing method.

Figure 5:
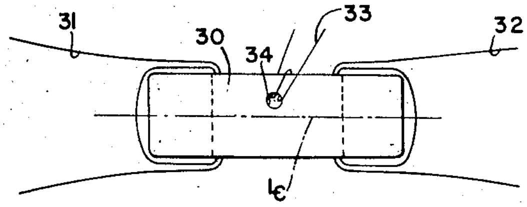
Figure 5 is a lateral view of the embodiment shown in Figure 4.

A second embodiment of the invention is illustrated in Fig. 3. Here a core 20 is shown having an input winding 21 and an output winding 22 positioned about the magnetic circuit in conventional manner. A sensing winding 23 is passed through an opening or hole 24 which, as illustrated, pierces the core laterally at a point between the center line of the core and its outer periphery. It is also contemplated that the opening 24 pass through the principal magnetic circuit in any direction so as to divide the core into two parallel magnetic paths of unequal area and the invention is not to be considered limited to the precise structural arrangement illustrated. Figure 4, for example, and Figure 5 which is a lateral view of the embodiment shown in Figure 4, shows an opening 34 corresponding to the opening 24 of Figure 3. In these figures the core is designated 30, the input winding 31, the output winding 32 and the interrogate or sense winding 33.

As in the previously described embodiment of Fig. 2, the core is caused to exist in one or the other binary digit representing residual state "*a*" or "*b*" and the remanence flux directions for these two conditions is indicated by arrows on the dotted lines. The sensing winding 23 is subjected to unidirectional current pulses and a flux path is described which may include the principal magnetic circuit as well as the localized region surrounding the opening 24. Considering the residual flux as uniformly distributed throughout the magnetic circuit, a portion may be considered to pass between the hole 24 and the outer periphery of the core and another portion to pass through the region between the hole 24 and the inner periphery. The entire section of the core at this point is standing at a residual state "*b*," for example, representing storage of a binary one, and, when the unidirectional sensing pulse is applied to winding 23 that region between the hole 24 and the outer periphery is more nearly saturated or the reluctance of this area increased by the sensing magnetomotive force. The residual flux then may be considered to alter its path or switch substantially to the region between the hole 24 and the inner core periphery, which region may then be caused to exist at a point intermediate the states "*b*" and "*c*," as shown on Fig. 1, when the direction of the sensing flux is aiding the residual flux, or between points "*b*" and "*d*," when opposed. The remanence flux of the storage core is varied as a result of this auxiliary sensing flux and, as the rate of variation is determined by the frequency or rate of change of the pulsations applied to the winding 23, the magnitude and phase of the voltage induced in winding 22 is indicative of the residual history of the core.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A bistable magnetic storage element comprising a closed magnetic circuit, an input winding positioned about said circuit, an output winding positioned about said circuit, an opening positioned through said magnetic circuit so as to divide said magnetic circuit into two parallel paths of unequal cross sectional area, and a sensing coil wound through said opening so as to encompass one of said parallel paths.

2. A magnetic storage device comprising a toroidal-shaped core having two stable states of magnetic remanence, an aperture in a circumferential face of said core, said aperture being offset from the center line that lies midway between the outer and inner peripheries of said toroidal core, a means for setting said core in one or the other of its stable states, an output winding coupled to said core and an interrogating winding positioned through said aperture and about a portion of said core for carrying a signal pulse, said signal pulse producing a localized flux field about said offset aperture for modifying the magnetic remanence flux path of said core so as to produce an output signal pulse in said output winding.

3. A magnetic storage element comprising a toroidal-shaped core having two stable states of magnetic remanence, an aperture in the body of said core, said aperture being offset from the center line that lies midway between the outer and inner peripheries of said toroidal core.

4. A bistable magnetic storage element comprising a closed magnetic circuit, an input winding positioned about said circuit, an output winding positioned about said circuit, a radial opening positioned through said magnetic circuit so as to divide said magnetic circuit into two parallel paths of unequal cross sectional area, and a sensing coil wound through said opening so as to encompass one of said parallel paths.

5. A magnetic storage element comprising a toroidal-shaped core having two stable states of magnetic remanence, a radially disposed aperture in the body of said core, said aperture being offset from the center line that lies midway between the outer and inner peripheries of said toroidal core.

6. A magnetic storage device comprising a toroidal-shaped core having two stable states of magnetic remanence, a radially disposed aperture in a circumferential face of said core, a winding inserted in said aperture, and about a portion of said core, said aperture being offset from the center line that lies midway between the outer and inner peripheries of said toroidal core so as to produce localized flux paths of different areas in a portion of said core about said aperture when a signal pulse is applied to said winding.

7. A magnetic storage device as defined in claim 6 including means for placing said toroidal core in one or the other of its stable states prior to the application of said signal pulse to said winding.

8. A magnetic storage device as defined in claim 7 including means for sensing the effect of the flux paths produced by said interrogating winding on the stable magnetic remanent state of said core.

9. A storage element comprising a magnetic circuit capable of assuming one or the other of two stable states of remanence, at least one input winding positioned about said magnetic circuit and adapted to be pulsed to place said magnetic circuit in one or the other of said remanence states, an output winding positioned about said magnetic circuit, a radially disposed opening positioned within said magnetic circuit and offset from the center line of said magnetic circuit, a sensing winding positioned within said opening and adapted to be pulsed intermittently and thereby influence the residual flux state of said magnetic circuit and cause a voltage to be induced in said output winding, which voltage is indicative of the remanence state of said storage element.

10. A storage element comprising a toroidal magnetic circuit capable of assuming one or the other of two stable states of remanence, at least one input winding positioned about said magnetic circuit and adapted to be pulsed to place said magnetic circuit in one or the other of said remanence states, an output winding positioned about said magnetic circuit, an opening positioned within said magnetic circuit and offset from the center line of said magnetic circuit, a sensing winding positioned within said opening and adapted to be pulsed intermittently and thereby influence the residual flux state of said magnetic circuit and cause a voltage to be induced in said output winding, which voltage is indicative of the remanence state of said storage element.

11. A magnetic storage element comprising a toroidal-shaped core having a substantially square hysteresis loop characteristic, and an aperture in a circumferential face of said core, said aperture being offset from the center line that lies midway between the outer and inner peripheries of said toroidal core.

12. A magnetic storage device comprising a toroidal-shaped core having two stable states of magnetic remanence, an aperture in a circumferential face of said core, a winding inserted in said aperture, and about a portion of said core, said aperture being offset from the center line that lies midway between the outer and inner peripheries of said toroidal core so as to produce localized flux paths of different areas in a portion of said core about said aperture when a signal pulse is applied to said winding.

13. A magnetic storage device as defined in claim 12 including means for placing said toroidal core in one or the other of its stable states prior to the application of said signal pulse to said winding.

14. A magnetic storage device as defined in claim 13 including means for sensing the effect of the flux paths produced by said interrogating winding on the stable magnetic remanent state of said core.

References Cited in the file of this patent

UNITED STATES PATENTS

| | | |
|---|---|---|
| 2,430,457 | Dimond | Nov. 11, 1947 |
| 2,649,574 | Mason | Aug. 18, 1953 |
| 2,700,703 | Nordyke | Jan. 25, 1955 |
| 2,708,219 | Carver | May 10, 1955 |
| 2,741,757 | Devol et al. | Apr. 10, 1956 |

OTHER REFERENCES

Communications and Electronics, January 1954, pp. 822–830, Manuscript received June 2, 1953.